United States Patent
Procter

(10) Patent No.: US 12,362,349 B2
(45) Date of Patent: Jul. 15, 2025

(54) POSITIVE ELECTRODE ACTIVE MATERIAL AND NONAQUEOUS ELECTROLYTE SECONDARY BATTERY USING THE POSITIVE ELECTRODE ACTIVE MATERIAL

(71) Applicant: Prime Planet Energy & Solutions, Inc., Tokyo (JP)

(72) Inventor: Momoko Procter, Seto (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 425 days.

(21) Appl. No.: 17/578,458

(22) Filed: Jan. 19, 2022

(65) Prior Publication Data

US 2022/0231277 A1     Jul. 21, 2022

(30) Foreign Application Priority Data

Jan. 20, 2021  (JP) .................................. 2021-006797

(51) Int. Cl.
  *H01M 4/48*   (2010.01)
  *H01M 4/36*   (2006.01)
  (Continued)

(52) U.S. Cl.
  CPC ........... *H01M 4/366* (2013.01); *H01M 4/485* (2013.01); *H01M 4/525* (2013.01); *H01M 2004/028* (2013.01); *H01M 2220/20* (2013.01)

(58) Field of Classification Search
  CPC ...... H01M 4/366; H01M 4/485; H01M 4/525; H01M 2004/028; H01M 2220/20;
  (Continued)

(56) References Cited

U.S. PATENT DOCUMENTS

2006/0029864 A1   2/2006   Matsumoto et al.
2012/0156565 A1   6/2012   Kim et al.
(Continued)

FOREIGN PATENT DOCUMENTS

CN   1767249 A    5/2006
CN   109565048 A  4/2019
(Continued)

OTHER PUBLICATIONS

CN110212187 machine translation (Year: 2019).*

*Primary Examiner* — Nicholas A Smith
*Assistant Examiner* — Ziheng Lu
(74) *Attorney, Agent, or Firm* — HAUPTMAN HAM, LLP

(57) ABSTRACT

The present disclosure provides a positive electrode active material which can impart an excellent low temperature output characteristic to a nonaqueous electrolyte secondary battery, and can suppress an increase in resistance after cycle charging and discharging. The positive electrode active material herein disclosed includes a core part including a lithium transition metal composite oxide, and a coating part including a titanium-containing compound on at least a partial surface of the core part. The coating part includes brookite type $TiO_2$ and a lithium titanium (LiTi) composite oxide including lithium (Li) and titanium (Ti) as titanium-containing compounds, and at least part of titanium (Ti) of the titanium-containing compound is incorporated in a solid solution in the surface of the core part.

7 Claims, 3 Drawing Sheets

(51) Int. Cl.
*H01M 4/485* (2010.01)
*H01M 4/525* (2010.01)
*H01M 4/02* (2006.01)

(58) Field of Classification Search
CPC .... H01M 4/131; H01M 4/505; H01M 10/052; H01M 10/0525
See application file for complete search history.

(56) References Cited

U.S. PATENT DOCUMENTS

| | | |
|---|---|---|
| 2013/0089788 A1 | 4/2013 | Furuya |
| 2013/0189581 A1 | 7/2013 | Imaizumi et al. |
| 2016/0380263 A1 | 12/2016 | Nakayama et al. |
| 2017/0222223 A1* | 8/2017 | Hong ............... H01M 4/62 |
| 2019/0198872 A1 | 6/2019 | Saruwatari et al. |
| 2020/0280069 A1 | 9/2020 | Okamoto |
| 2020/0388834 A1* | 12/2020 | Horikawa ......... H01M 10/0525 |
| 2020/0388835 A1 | 12/2020 | Horikawa et al. |
| 2020/0388840 A1* | 12/2020 | Horikawa ............. H01M 4/131 |

FOREIGN PATENT DOCUMENTS

| | | |
|---|---|---|
| CN | 110212187 A | 9/2019 |
| CN | 111566857 A | 8/2020 |
| CN | 112054163 A | 12/2020 |
| CN | 112054190 A | 12/2020 |
| CN | 112054193 A | 12/2020 |
| JP | 2002151078 A | 5/2002 |
| JP | 2011146158 A | 7/2011 |
| JP | 2011521881 A | 7/2011 |
| JP | 20129200 A | 1/2012 |
| JP | 201228163 A | 2/2012 |
| JP | 201333696 A | 2/2013 |
| JP | 6026679 B2 | 11/2016 |
| JP | 60266679 B2 | 11/2016 |
| WO | 2009146904 A1 | 12/2009 |

* cited by examiner

POSITIVE ELECTRODE ACTIVE MATERIAL AND NONAQUEOUS ELECTROLYTE SECONDARY BATTERY USING THE POSITIVE ELECTRODE ACTIVE MATERIAL

CROSS REFERENCE TO RELATED APPLICATIONS

The present application claims the priority based on Japanese Patent Application No. 2021-006797 filed on Jan. 20, 2021, the entire contents of which are incorporated by reference in the present specification.

BACKGROUND OF THE DISCLOSURE

1. Technical Field

The present disclosure relates to a positive electrode active material. The present disclosure also relates to a nonaqueous electrolyte secondary battery using the positive electrode active material.

2. Description of Background

In recent years, a nonaqueous electrolyte secondary battery such as a lithium ion secondary battery has been preferably used as a portable power supply for a personal computer, a portable terminal, or the like, or a power supply for driving automobiles such as a battery electric vehicle (BEV), a hybrid electric vehicle (HEV), and a plug-in hybrid electric vehicle (PHEV).

More and more nonaqueous electrolyte secondary batteries are used and have been required to be further enhanced in performances with the spread thereof. For example, Japanese Patent Application Publication No. 2012-9200 discloses as follows: a conductive material, which is obtained by subjecting a $Li_4Ti_5O_{12}$ sintered body to RF (radio frequency) magnetron sputtering in a nitrogen-containing atmosphere, thereby changing the chemical state of titanium, and in which the $Li_4Ti_5O_{12}$ phase, the rutile type $TiO_2$ phase, and the anatase type $TiO_2$ phase are observed by XRD analysis, is used for the negative electrode active material. There is a description in the publication to the effect that such a conductive material can increase the capacity per unit amount by eliminating or reducing the conductive agent. Further, Japanese Patent Application Publication No. 2012-28163 discloses the positive electrode active material in which a titanium concentrated layer is formed on the surface of a primary particle and/or the grain boundary between the primary particles. There is a description in the publication to the effect that, in the positive electrode active material, the titanium concentrated layer acts as a conductor, and hence insertion/extraction of lithium ions become smooth; accordingly, when such a positive electrode active material is used as a positive electrode, it is possible to form a secondary battery with a high capacity, high stability, and a high output characteristic.

SUMMARY

However, the present inventors conducted a diligent study thereon and found as follows: for a nonaqueous electrolyte secondary battery using a related-art positive electrode or negative electrode active material, there is still room for an improvement in reduction of the reaction resistance under low temperature environment; and the low temperature output characteristic is insufficient. Further, the present inventors found that there is still room for an improvement in effect of suppressing the increase in resistance after repeating a charging and discharging cycle.

The present disclosure has been made in view of such circumstances. It is a main object of the present disclosure to provide a positive electrode active material for imparting an excellent low temperature output characteristic to a nonaqueous electrolyte secondary battery, and suppressing the increase in resistance after cycle charging and discharging cycle. Further, it is another object thereof to provide a nonaqueous electrolyte secondary battery using such a positive electrode active material.

In order to achieve the foregoing objects, the positive electrode active material herein disclosed is provided. The positive electrode active material herein disclosed includes: a core part including a lithium transition metal composite oxide; and a coating part including a titanium-containing compound on at least a partial surface of the core part. The titanium-containing compound includes brookite type $TiO_2$ and a LiTi composite oxide including Li and Ti, and at least part of Ti of the titanium-containing compound is incorporated in a solid solution in a surface of the core part.

As described above, the brookite type $TiO_2$ having the effect of speeding up the insertion/extraction of Li ions, and the LiTi composite oxide including Li and Ti capable of becoming a carrier of Li are coated on the core part. As a result, it is possible to reduce the reaction resistance even under low temperature environment, and to improve the low temperature output characteristic. Further, part of Ti of the titanium-containing compound is incorporated in a solid solution in the surface of the core part. As a result, the coating part becomes more likely to be held on the core part, and the collapse of the crystal structure of the core part can be suppressed, and the increase in resistance of the secondary battery can be suppressed. With such a configuration, it is possible to implement a positive electrode active material for imparting an excellent low temperature output characteristic to the nonaqueous electrolyte secondary battery, and suppressing the increase in resistance after cycle charging and discharging.

As one preferable aspect of the positive electrode active material herein disclosed, an abundance ratio (A/B) of a Ti abundance (A) as the brookite type $TiO_2$ and a Ti abundance (B) as the LiTi composite oxide is 0.1 or more and 4.6 or less, with a Ti abundance in the coating part calculated based on Ti peak diffraction of XAFS being 100. Further, as another preferable aspect, an amount of Ti included in the coating part is 0.1 part or more and 10 parts or less, relative to 100 parts of a metal element except for an alkali element included in the core part calculated in terms of mol based on ICP analysis.

With such a configuration, the effects of imparting the nonaqueous electrolyte secondary battery with an excellent low temperature output characteristic, and suppressing the increase in resistance after cycle charging and discharging become particularly high.

As a still other preferable aspect of the positive electrode active material herein disclosed, the core part includes the lithium transition metal composite oxide including at least Ni as a transition metal element.

With such a configuration, the effects of imparting the nonaqueous electrolyte secondary battery with an excellent low temperature output characteristic, and suppressing the increase in resistance after cycle charging and discharging become particularly high.

In order to achieve the other object, a nonaqueous electrolyte secondary battery including a positive electrode, a negative electrode, and a nonaqueous electrolyte is provided. Herein, the positive electrode includes the positive electrode active material.

With such a configuration, it is possible to provide a nonaqueous electrolyte secondary battery having an excellent low temperature output characteristic, and suppressed in increase in resistance after cycle charging and discharging.

DETAILED DESCRIPTION

Below, referring to the accompanying drawings, preferable embodiments of the present disclosure will be described. It is naturally understood that the embodiments herein described should not be construed as restring the present disclosure. Incidentally, matters necessary for executing the present disclosure, except for matters specifically referred to in the present specification (e.g., a general configuration of a nonaqueous electrolyte secondary battery not characterizing the present disclosure) can be grasped as design matters of those skilled in the art based on the related art in the present field. The present disclosure can be executed based on the contents disclosed in the present specification, and the technical common sense in the present field. Further, a reference sign X in each figure represents the "width direction", and a reference sign Z represents the "height direction". Incidentally, the dimensional relation (such as length, width, or thickness) does not reflect the actual dimensional relation.

Further, it is assumed that the expression of "A to B (provided that A or B is a given value) showing the range in the present specification means A or more and B or less.

In the present specification, the term "battery" is a term denoting an electric storage device capable of extracting the electric energy in general, and is a concept including a primary battery and a secondary battery. The term "secondary battery" is a term denoting an electric storage device capable of repeatedly charging and discharging in general, and including a so-called storage battery, and an electric storage element such as an electric double layer capacitor. Further, in the present specification, the term "lithium ion secondary battery" denotes a secondary battery using lithium ions as electric charge carriers, and implementing charging and discharging by the transfer of electric charges accompanying lithium ions between the positive and negative electrodes.

Figure 1:
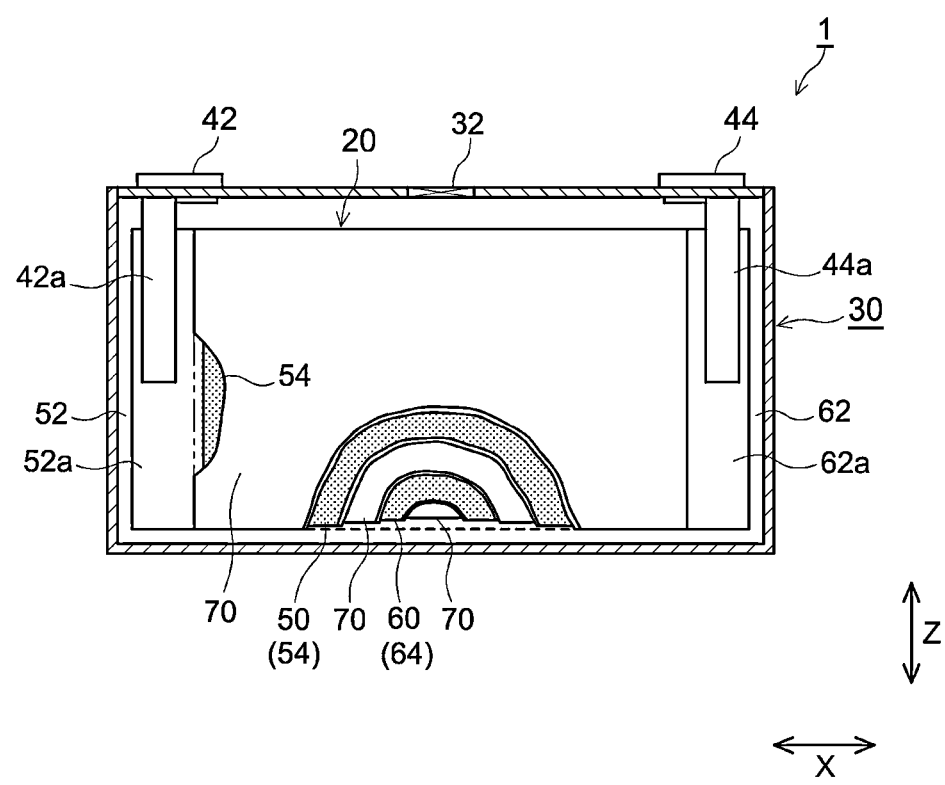
FIG. 1 is a cross sectional view schematically showing the internal structure of a lithium ion secondary battery in accordance with one embodiment.

FIG. 1 is a cross sectional view schematically showing a lithium ion secondary battery in accordance with one embodiment. As shown in FIG. 1, a lithium ion secondary battery 1 is a closed type battery constructed by accommodating a wound electrode body 20 in a flat shape and a nonaqueous electrolyte (not shown) in a flat battery case (i.e., an exterior container) 30. The battery case 30 is provided with a positive electrode terminal 42 and a negative electrode terminal 44 for external connection, and a thin-walled safety valve 32 set for releasing the internal pressure when the internal pressure of the battery case 30 increases to a prescribed level, or higher. The positive electrode terminal 42 is electrically connected with a positive electrode collector sheet 42a. The negative electrode terminal 44 is electrically connected with a negative electrode collector sheet 44a. As the material for the battery case 30, for example, a metal material which is lightweight and has good thermal conductivity such as aluminum is used.

Figure 2:
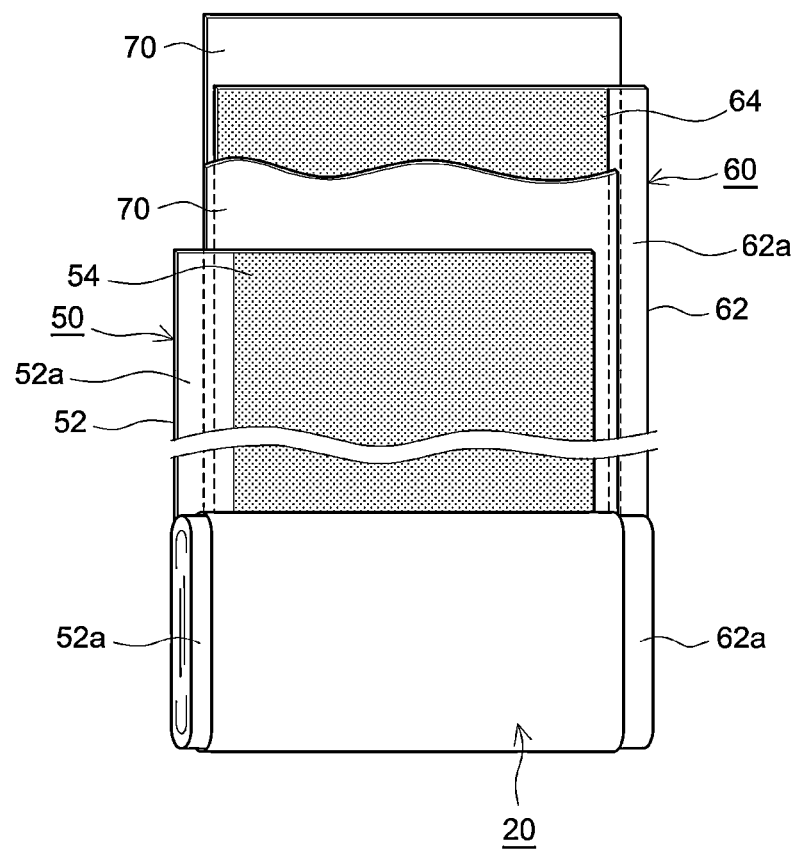
FIG. 2 is view schematically showing the configuration of a wound electrode body of a lithium ion secondary battery in accordance with one embodiment.

The wound electrode body 20 has a form in which rectangular sheet-shaped positive electrode (which will be hereinafter referred to as a "positive electrode sheet 50") and a rectangular sheet-shaped negative electrode (which will be hereinafter referred to as a "negative electrode sheet 60") are stacked one on another via two long separators (which will be hereinafter referred to as separator sheets 70), and are wound in the longitudinal direction as shown in FIGS. 1 and 2. The positive electrode sheet 50 has a configuration in which a positive electrode active material layer 54 is formed along the longitudinal direction on one surface or both surfaces of a long positive electrode collector 52. The negative electrode sheet 60 has a configuration in which a negative electrode active material layer 64 is formed along the longitudinal direction on one surface or both surfaces of a long negative electrode collector 62. One edge in the width direction of the positive electrode collector 52 is provided with a portion at which the positive electrode active material layer 54 is not formed along the edge, and the positive electrode collector 52 is exposed (i.e., a positive electrode collector exposed part 52a). The other edge in the width direction of the negative electrode collector 62 is provided with a portion at which the negative electrode active material layer 64 is not formed along the edge, and the negative electrode collector 62 is exposed (i.e., a negative electrode collector exposed part 62a). The positive electrode collector exposed part 52a and the negative electrode collector exposed part 62a are joined with the positive electrode collector sheet 42a and the negative electrode collector sheet 44a, respectively.

As the positive electrode collector 52, a conventionally known positive electrode collector for use in a lithium ion secondary battery may be used. As one example thereof, mention may be made of a sheet or foil made of a metal with good electric conductivity (e.g., aluminum, nickel, titanium, or stainless steel). The positive electrode collector 52 is preferably, for example, aluminum foil. The dimension of the positive electrode collector 52 has no particular restriction, and may be appropriately determined according to the battery design. When aluminum foil is used as the positive electrode collector 52, the dimension is, for example, preferably 5 µm or more and 35 µm or less, and more preferably 7 µm or more and 20 µm or less.

The positive electrode active material layer 54 includes the positive electrode active material herein disclosed. The positive electrode active material layer 54 may include other components than the positive electrode active material, for example, trilithium phosphate, a conductive material, and a binder. As the conductive material, for example, carbon black such as acetylene black (AB), or other carbon materials (e.g., graphite) can be preferably used. As the binder, for example, polyvinylidene fluoride (PVDF) can be used. Further, other materials than the foregoing ones (e.g., various additives) may be included therein unless the effects of the present disclosure are impaired.

Although not particularly restricted, the content of the positive electrode active material in the positive electrode active material layer 54 (i.e., the content of the positive electrode active material based on the total mass of the positive electrode active material layer 54) is preferably 70 mass % or more, more preferably 80 mass % or more and 97 mass % or less, and further preferably 85 mass % or more and 96 mass % or less. The content of trilithium phosphate in the positive electrode active material layer 54 is preferably, for example, 1 mass % or more and 15 mass % or less, and more preferably 2 mass % or more and 12 mass % or less. The content of the conductive material in the positive electrode active material layer 54 is preferably, for example, 1 mass % or more and 15 mass % or less, and more preferably 3 mass % or more and 13 mass % or less. The content of the binder in the positive electrode active material layer 54 is, for example, preferably, 1 mass % or more and 15 mass % or less, and more preferably 1.5 mass % or more and 10 mass % or less.

The thickness of the positive electrode active material layer 54 has no particular restriction, and is for example, preferably, 10 μm or more and 300 μm or less, and more preferably 20 μm or more and 200 μm or less.

As the negative electrode collector 62, a conventionally known negative electrode collector for use in a lithium ion secondary battery may be used. As one example thereof, mention may be made of a sheet or foil made of a metal with good electrical conductivity (e.g., copper, nickel, titanium, or stainless steel). The negative electrode collector 62 is preferably, for example, copper foil. The dimension of the negative electrode collector 62 has no particular restriction, and may be appropriately determined according to the battery design. When copper foil is used as the negative electrode collector 62, the dimension is, for example, preferably 5 μm or more and 35 μm or less, and more preferably 7 μm or more 20 μm or less.

The negative electrode active material layer 64 includes a negative electrode active material. As the negative electrode active material, for example, a carbon material such as graphite, hard carbon, or soft carbon can be preferably used. Graphite may be natural graphite or artificial graphite, and may be amorphous carbon coated graphite in a form in which graphite is coated with an amorphous carbon material.

The average particle diameter (median diameter: D50) of the negative electrode active material has no particular restriction, and is, for example, preferably 0.1 μm or more and 50 μm or less, and more preferably 1 μm or more and 25 μm or less. Incidentally, the average particle diameter (D50) of the negative electrode active material can be determined by, for example, the laser diffraction scattering method.

As the additive materials other than the negative electrode active material included in the negative electrode active material layer 64, mention may be made of a binder, a thickener, or the like. As the binder, for example, styrene butadiene rubber (SBR) can be preferably used. As the thickener, for example, carboxymethyl cellulose (CMC), or methyl cellulose (MC) can be preferably used. Further, other materials than the foregoing ones (e.g., various additives) may be included unless the effects of the present disclosure are impaired.

Although not particularly restricted, the content of the negative electrode active material in the negative electrode active material layer 64 is preferably 90 mass % or more, and more preferably 95 mass % or more and 99 mass % or less. The content of the binder in the negative electrode active material layer 64 is, for example, preferably 0.1 mass % or more and 8 mass % or less, and more preferably 0.5 mass % or more and 3 mass % or less. The content of the thickener in the negative electrode active material layer 64 is, for example, preferably 0.3 mass % or more and 3 mass % or less, and more preferably 0.5 mass % or more and 2 mass % or less.

The thickness of the negative electrode active material layer 64 has no particular restriction, and is, for example, preferably 10 μm or more and 300 μm or less, and more preferably 20 μm or more and 200 μm or less.

Examples of the separator sheet 70 may include a porous sheet (film) including a resin such as polyethylene (PE), polypropylene (PP), polyester, cellulose, or polyamide. Such a porous sheet may be a monolayered structure, or a lamination structure of two or more layers (e.g., a three-layered structure in which PP layers are stacked on both surfaces of a PE layer). The separator sheet 70 may be provided with a heat resistant layer (HRL).

For the nonaqueous electrolyte, the same one as that of a conventional lithium ion secondary battery can be used. Typically, the one obtained by allowing a support salt to be included in an organic solvent (nonaqueous solvent) can be used. As the nonaqueous solvents, organic solvents such as carbonates, esters, ethers, nitriles, sulfones, and lactones can be used without particular restriction. Specifically, for example, nonaqueous solvents such as ethylene carbonate (EC), diethyl carbonate (DEC), dimethyl carbonate (DMC), ethyl methyl carbonate (EMC), monofluoroethylene carbonate (MFEC), difluoroethylene carbonate (DFEC), monofluoromethyl difluoromethyl carbonate (F-DMC), and trifluoro dimethyl carbonate (TFDMC) can be preferably used. Such nonaqueous solvents can be used singly alone, or in appropriate combination of two or more thereof.

As the support salt, for example, a lithium salt such as $LiPF_6$, $LiBF_4$, or $LiClO_4$ can be preferably used. The concentration of the support salt has no particular restriction, and is preferably about 0.7 mol/L or more and 1.3 mol/L or less.

Incidentally, the nonaqueous electrolyte may include other components than the nonaqueous solvent and the support salt, for example, various additives including a film forming agent such as oxalate complex; a gas generator such as biphenyl (BP) or cyclohexyl benzene (CHB); a dispersant; and a thickener; and the like unless the effects of the present disclosure are remarkably impaired.

A lithium ion secondary battery 1 can be manufactured in the same manner as the conventionally known method, except for using the positive electrode active material herein disclosed as the positive electrode active material.

Figure 3:
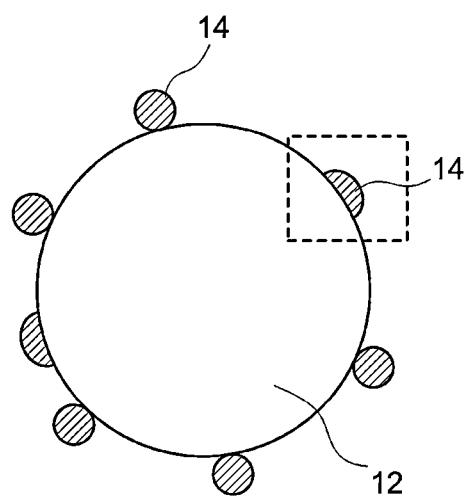
FIG. 3 is a view schematically showing one example of a positive electrode active material for use in a lithium ion secondary battery in accordance with one embodiment.

Then, the positive electrode active material for use in the present embodiment will be described. FIG. 3 is a view schematically showing one example of the positive electrode active material for use in the lithium ion secondary battery 1 in accordance with the present embodiment. As shown in FIG. 3, the positive electrode active material 10 includes a core part 12 and a coating part 14. The coating part 14 is formed on at least a partial surface of the core part 12. As shown in the square frame of FIG. 3, at least some of Ti included in the coating part 14 is incorporated in a solid solution in the surface of the core part 12.

(a) Core Part

The core part 12 is a particle including a lithium transition metal composite oxide. The crystal structure of the lithium transition metal composite oxide has no particular restriction, and may be a layered structure, a spinel structure, an olivine structure, or the like. As the lithium transition metal composite oxide, a lithium transition metal composite oxide including at least one of Ni, Co, and Mn as a transition metal element is preferable. Specifically, mention may be made of a lithium nickel type composite oxide, a lithium cobalt type composite oxide, a lithium manganese type composite oxide, a lithium nickel manganese type composite oxide, a lithium nickel cobalt manganese type composite oxide, a lithium nickel cobalt aluminum type composite oxide, a lithium iron nickel manganese type composite oxide, and the like. In the present embodiment, the lithium transition metal composite oxide including at least Ni as the transition metal element is in particular preferable.

Incidentally, in the present specification, the "lithium nickel cobalt manganese type composite oxide" is a term including, other than the oxides including Li, Ni, Co, Mn, or O as the constituent element, even an oxide including one or two or more additive elements other than these. Examples of such an additive element may include transition metal elements and typical metal elements such as Mg, Ca, Al, V, Cr, Y, Zr, Nb, Mo, Hf, Ta, W, Na, Fe, Zn, and Sn. Further, the additive elements may be semi-metal elements such as B, C, Si, and P, or non-metal elements such as S, F, Cl, Br, and I. The same also applies to the case where the lithium nickel type composite oxide, the lithium cobalt type composite oxide, the lithium manganese type composite oxide, the lithium nickel manganese type composite oxide, the lithium nickel cobalt manganese type composite oxide, the lithium nickel cobalt aluminum type composite oxide, the lithium iron nickel manganese type composite oxide, or the like is used as the core part 12.

As the lithium nickel cobalt manganese type composite oxide, the one having the composition expressed by the following formula (I) is preferable.

$$Li_{1+x}Ni_yCo_zMn_{(1-y-z)}M_\alpha O_{2-\beta}Q_\beta \qquad (I)$$

In the formula (I), x, y, z, $\alpha$, and $\beta$ satisfy $0 \le x \le 0.7$, $0.1 < y < 0.9$, $0.1 < z < 0.4$, $0 \le \alpha \le 0.1$, and $0 \le \beta \le 0.5$, respectively. M is at least one element selected from the group consisting of Zr, Mo, W, Mg, Ca, Na, Fe, Cr, Zn, Sn, and Al. Q is at least one element selected from the group consisting of F, Cl, and Br. From the viewpoint of the energy density and the thermal stability, y and z preferably satisfy $0.3 \le y \le 0.5$ and $0.2 \le z \le 0.4$, respectively. x preferably satisfies $0 \le x \le 0.25$, more preferably satisfies $0 \le x \le 0.15$, and is further preferably 0. $\alpha$ preferably satisfies $0 \le \alpha \le 0.05$, and more preferably is 0. $\beta$ preferably satisfies $0 \le \beta \le 0.1$, and more preferably is 0.

The shape of the core part 12 has no particular restriction, and may be a spherical shape, a sheet shape, a needle shape, an amorphous shape, or the like. Alternatively, the core part 12 may be in a form of a secondary particle including primary particles aggregated therein, or in a hollow form. The average particle diameter (median diameter: D50) of the core part 12 is, for example, 0.05 µm or more and 20 µm or less, preferably 1 µm or more and 20 µm or less, and more preferably 3 µm or more and 15 µm or less. Incidentally, the average particle diameter (D50) of the core part 12 can be determined by, for example, the laser diffraction scattering method.

Incidentally, the core part 12 can be manufactured, for example, in the following manner. The precursor (e.g., metal hydroxide) of a lithium transition metal composite oxide is manufactured by the crystallization method, or the like, and lithium is introduced into the precursor. As a result, the core part 12 can be manufactured.

(b) Coating Part

A coating part 14 is formed on at least a partial surface of the core part 12. Such a coating part 14 includes a titanium-containing compound. The coating part 14 includes a composite oxide (which is also referred to as a LiTi composite oxide) including brookite type $TiO_2$, and Li and Ti as titanium-containing compounds. Then, at least some of Ti included in the titanium-containing compound is incorporated in a solid solution in the surface of the core part 12 as shown in the square frame of FIG. 3.

The coating part 14 may only be present (i.e., be interspersed) on at least a partial surface of the core part 12 as shown in FIG. 3, and has no particular restriction on the form. For example, the coating part 14 may be formed on the entire surface of the core part 12. Although the thickness of the coating part 14 has no particular restriction, the thickness is, for example, 0.1 nm or more and 500 nm or less. The thickness of the coating part 14 can be determined by, for example, observing the cross section of the positive electrode active material 10 by Energy Dispersive X-ray Spectroscopy (TEM-EDX) using a transmission electron microscope.

In the present embodiment, at least some of Ti included in the titanium-containing compound is incorporated in a solid solution in the surface of the core part 12. At least some of Ti is incorporated in a solid solution, which can suppress releasing of the coating part 14 from the core part 12. Such a coating part 14 is held by the core part 12. As a result, the collapse of the crystal structure of the core part 12 is suppressed, and the increase in resistance of the secondary battery after repeating cycle charging and discharging is suppressed.

Incidentally, at least some of Ti included in the titanium-containing compound is incorporated in a solid solution in the surface of the core part 12. This can be confirmed, for example, by element mapping by TEM-EDX.

The coating part 14 includes brookite type $TiO_2$ as the titanium-containing compound as described above. Generally, as the crystal structure of $TiO_2$, anatase type (tetragonal), rutile type (tetragonal), brookite type (rhombic), and the like are known. The brookite type crystal structure is very unstable as compared with the anatase type and rutile type crystal structures. For example, when the brookite type $TiO_2$ is heated to 650° C. or more, transition to the most stable rutile type $TiO_2$ is caused. Such brookite type $TiO_2$ tends to form a complex with Li ions because the crystal structure is unstable. For this reason, the coating part including the brookite type $TiO_2$ speeds up the extraction and insertion of Li ions from and to the positive electrode active material. As a result, it is possible to reduce the reaction resistance (electric charge transfer resistance) of the positive electrode active material. For this reason, it is also possible to improve the output characteristic of the secondary battery under low temperature environment.

Incidentally, the coating part 14 includes the brookite type $TiO_2$. This can be confirmed by a conventionally known method. For example, the coating part 14 including the brookite type $TiO_2$ can be confirmed by performing X-ray absorption fine structure (XAFS) analysis on the coating part 14, and analyzing the Ti peak.

The brookite type $TiO_2$ has a very unstable crystal structure, and hence has been difficult to use as a coating substance. However, the present inventors conducted a close study thereon, and as a result, found that the coating part 14 including the brookite type $TiO_2$ can be formed on at least a partial surface of the core part 12 by a mechanochemical treatment.

The coating part 14 includes a LiTi composite oxide as the titanium-containing compound as described above. As the LiTi composite oxide, for example, a LiTi composite oxide such as $Li_2TiO_3$ or $Li_4Ti_5O_{12}$ can be used. As the LiTi composite oxide, LiTi composite oxides having different atomic ratios of Li to Ti (Li/Ti) may be used in mixture of two or more thereof.

Incidentally, the LiTi composite oxide may be synthesized by a conventionally known synthesis method, or may be prepared by purchasing a commercially available product.

The abundance ratio (A/B) of the Ti abundance (A) as the brookite type $TiO_2$ and the Ti abundance (B) as the LiTi composite oxide with the Ti abundance included in the coating part 14 taken as 100 is preferably 0.04 or more and 10.1 or less, more preferably 0.1 or more and 4.6 or less, and further preferably 1.4 or more and 4.6 or less.

Incidentally, the abundance ratio (A/B) of the Ti abundance (A) as the brookite type $TiO_2$ and the Ti abundance (B) as the LiTi composite oxide can be determined by Ti peak analysis by XAFS. Although specific measurement device and measurement conditions will be described in examples described later, for example, the Ti peaks of standard samples of Ti included in the titanium-containing compound (e.g., brookite type $TiO_2$, and $Li_2TiO_3$) are respectively determined by XAFS analysis. Then, the Ti peak of the positive electrode active material 10 (target sample) including the coating part 14 is determined by XAFS analysis. The Ti peak of such a standard sample, and the Ti peak of the target sample are subjected to fitting using the analysis software of XAFS (such as Athena or Artemis), thereby to be quantified. As a result of this, the abundance ratio (A/B) of the Ti abundance (A) as the brookite type $TiO_2$ and the Ti abundance (B) as the LiTi composite oxide can be determined.

Incidentally, the coating part 14 may include other components in such a range so as not to remarkably impair the effects of the present disclosure. Examples of other components may include $TiO_2$ (i.e., the anatase type $TiO_2$ and the rutile type $TiO_2$) other than the brookite type $TiO_2$.

The amount of Ti included in the coating part 14 is preferably 0.1 part or more and 10 parts or less, more preferably 0.3 part or more and 7.5 parts or less, and further preferably 1.5 parts or more and 7.5 parts or less for every 100 parts of the metal elements except for the alkali metal element included in the core part 12 in terms of mol. With such a configuration, the output characteristic under low temperature environment is favorable, and it is possible to suppress the increase in resistance after repeating the charging and discharging cycle.

Incidentally, the "amount of the metal elements except for alkali metals included in the core part" and the "amount of Ti included in the coating part" can be determined by ICP analysis.

A positive electrode active material 10 in accordance with the present embodiment can be manufactured, for example, in the following manner. First, a core part 12, and brookite type $TiO_2$ and a LiTi composite oxide as titanium-containing compounds were charged into a mechanochemical device, and were subjected to a coating treatment. Subsequently, the resulting mixed powder was subjected to a heat treatment, thereby incorporating at least some of Ti included in the titanium-containing compound in a solid solution in the surface of the core part 12. As a result of this, the positive electrode active material 10 can be manufactured.

The lithium ion secondary battery 1 including the positive electrode active material 10 configured as described up to this point is usable for various uses. For example, the lithium ion secondary battery 1 can be preferably used as a high output power source for a motor to be mounted on an automobile (driving power supply). The kind of the automobile has no particular restriction. Typically, mention may be made of a vehicle, for example, a plug-in hybrid electric vehicle (PHEV), a hybrid electric vehicle (HEV), or a battery electric vehicle (BEV). The lithium ion secondary battery 1 can also be used in a form of an assembled battery including a plurality of batteries electrically connected to one another.

Below, test examples regarding the present disclosure will be described. However, it is not intended that the present disclosure is limited to such test examples.

Example 1

First, an aqueous solution obtained by dissolving a sulfuric acid salt of a metal other than Li was prepared. For example, when a $LiNi_{1/3}Co_{1/3}Ni_{1/3}O_2$ particle having a layered structure was manufactured as the core part, an aqueous solution including nickel sulfate, cobalt sulfate, and manganese sulfate so that the molar ratios of Ni, Co, and Mn became 1:1:1 was prepared in a reaction vessel. NaOH and aqueous ammonia were added to the aqueous solution in the reaction vessel for neutralization, thereby crystallizing composite hydroxide including other metals than Li to serve as the precursor of the core part. The resulting composite hydroxide and lithium carbonate were mixed at prescribed ratios. For example, when a $LiNi_{1/3}Co_{1/3}Mn_{1/3}O_2$ particle having a layered structure was manufactured as the core part, the composite hydroxide and lithium carbonate were mixed so that the molar ratios of (Ni+Co+Mn):Li became 1:1. The mixture was burnt at a temperature of 870° C. for 15 hours. Such a mixture was cooled to room temperature (25° C.±5° C.), and was subjected to a disaggregation treatment, resulting in a spheroidal particle (core part) including primary particles aggregated therein.

In this manner, as the core parts, $LiNi_{1/3}Co_{1/3}Mn_{1/3}O_2$, $LiCoO_2$, $LiMn_2O_4$, $LiNiO_2$, $LiNi_{0.5}Mn_{1.5}O_4$, and $LiNi_{0.8}Co_{0.15}Al_{0.05}O_2$ were manufactured.

The resulting core part ($LiNi_{1/3}Co_{1/3}Mn_{1/3}O_2$), and the brookite type $TiO_2$ ("TIO19PB" manufactured by Kojundo Chemical Lab. Co., Ltd.: purity 4 N) and $Li_2TiO_3$ as the titanium-containing compounds were charged into a mechanochemical device, and were subjected to a mechanochemical treatment at a number of revolutions of 6000 rpm for 30 minutes. As a result of this, a coating part including a titanium-containing compound was formed on at least a partial surface of the core part. The powder after the mechanochemical treatment was subjected to a heat treatment at a temperature of 500° C. for 1 hour. As a result of this, at least some of Ti of the titanium-containing compound was incorporated in a solid solution in the surface of the core part (Example 1).

Examples 2 to 5

$LiNi_{1/3}Co_{1/3}Mn_{1/3}O_2$ as the core part, and brookite type $TiO_2$ and $Li_2TiO_3$ as titanium-containing compounds were charged into a mechanochemical device, and were subjected to a mechanochemical processing at a number of revolutions of 6000 rpm for 30 minutes. The amount of the brookite type $TiO_2$ and $Li_2TiO_3$ at this step was changed, thereby changing the abundance ratio (A/B) of the Ti abundance (A) as titanium dioxide ($TiO_2$) and the Ti abundance (B) as the LiTi composite oxide. The powder after the mechanochemical treatment was subjected to a heat treatment at a temperature of 500° C. for 1 hour. As a result of this, at least some of Ti of the titanium-containing compound was incorporated in a solid solution in the surface of the core part. In this manner, the active materials of Examples 2 to 5 were obtained.

Comparative Example 1

$LiNi_{1/3}Co_{1/3}Mn_{1/3}O_2$ was used as it was (i.e., without being subjected to a mechanochemical treatment) as an active material of Comparative Example 1.

Comparative Example 2

$LiNi_{1/3}Co_{1/3}Mn_{1/3}O_2$ as the core part and brookite type $TiO_2$ and $Li_2TiO_3$ as titanium-containing compounds were charged into a mechanochemical device, and were subjected to a mechanochemical treatment at a number of revolutions of 6000 rpm for 30 minutes. This was used as it was (i.e., without being subjected to a heat treatment) as an active material of Comparative Example 2.

Comparative Examples 3 to 6

$LiNi_{1/3}Co_{1/3}Mn_{1/3}O_2$ was prepared as the core part, and the titanium-containing compound was varied, resulting in active materials of Comparative Examples 3 to 6.

In Comparative Example 3, $LiNi_{1/3}Co_{1/3}Mn_{1/3}O_2$ as the core part, and brookite type $TiO_2$ as the titanium-containing compound were charged into a mechanochemical device.

In Comparative Example 4, $LiNi_{1/3}Co_{1/3}Mn_{1/3}O_2$ as the core part and $Li_2TiO_3$ as the titanium-containing compound were charged into a mechanochemical device.

In Comparative Example 5, $LiNi_{1/3}Co_{1/3}Mn_{1/3}O_2$ as the core part, and anatase type $TiO_2$ and $Li_2TiO_3$ as the titanium-containing compounds were charged into a mechanochemical device.

In Comparative Example 6, $LiNi_{1/3}Co_{1/3}Mn_{1/3}O_2$ as the core part, and rutile type $TiO_2$ and $Li_2TiO_3$ as the titanium-containing compounds were charged into a mechanochemical device.

The mechanochemical treatment was performed under the conditions of a number of revolutions of 6000 rpm and 30 minutes. The powder after the mechanochemical treatment was subjected to a heat treatment at a temperature of 500° C. for 1 hour. As a result of this, at least some of Ti of the titanium-containing compound was incorporated in a solid solution in the surface of the core part. In this manner, active materials of Comparative Examples 3 to 6 were obtained.

Observation of Positive Electrode Active Material

Using TEM-EDX (TEM device: JFE-ARM300F, EDX device: JED-2300T manufactured by JEOL), element mapping was performed, and the positive electrode active material of each Example was observed. As a result, for Examples 1 to 5, and Comparative Examples 3 to 6, in each of which a heat treatment was performed, it could be observed that at least some of Ti of the titanium-containing compound was incorporated in a solid solution. The results are shown in Table 1.

The abundance ratio (A/B) of the Ti abundance (A) as $TiO_2$, and the Ti abundance (B) as the LiTi composite oxide present at the coating part was determined by XAFS analysis. The analysis conditions were set as described below.

Analyzer: Aichi Synchrotron Radiation Center BL5S1
Measurement method: transmission method (standard sample) and the fluorescence method (Example and Comparative Example).
Monochromator: double crystal spectrometer
Analyzing crystal: Si (111)
Measurement absorption edge: Ti-K absorption edge
Measurement energy region: 4800 eV to 6000 eV
Analysis software: Athena (Demeter ver. 0.9.26)

A standard sample of the brookite type $TiO_2$ and boron nitride were mixed at a molar ratio of 1:99 using a dancing mill. Further, a standard sample of $Li_2TiO_3$ and boron nitride were mixed at a molar ratio of 1:99 using a dancing mill. Such mixtures were pressed under a press pressure of 30 kN, thereby manufacturing each analyzing specimen. Such specimens were analyzed under the conditions of XAFS, thereby determining the Ti peak of the brookite type $TiO_2$ and the Ti peak of $Li_2TiO_3$. Incidentally, each Ti peak of the anatase type $TiO_2$ and the rutile type $TiO_2$ was also determined in the same manner.

Then, the active materials of Examples 1 to 5 and Comparative Examples 1 to 6 were pressed under a press pressure of 30 kN, thereby manufacturing respective analyzing specimens. These were measured under the conditions of XAFS, and their respective Ti peaks were determined. The Ti peak of $TiO_2$ and the Ti peak of $Li_2TiO_3$ determined by the measurement of the standard samples, and the Ti peaks of respective examples (around 5000 eV) were subjected to fitting using analysis software Athena for quantification. As a result of this, the Ti abundance (A) as $TiO_2$ and the Ti abundance (B) as LiTi composite oxide were determined, thereby calculating the abundance ratio (A/B) (which will be hereinafter referred to as the abundance ratio (A/B) of Ti in the coating part). The results are shown in Table 1.

Manufacturing of Evaluating Lithium Ion Secondary Battery

Each active material of respective Examples and respective Comparative Examples manufactured, acetylene black (AB) as a conductive material, polyvinylidene fluoride (PVDF) as a binder, and N-methyl pyrrolidone (NMP) as a disperse medium were mixed using a planetary mixer, thereby preparing a positive electrode active material layer forming paste. At this step, the mass ratios of the active material, AB, and PVDF were set at 90:8:2, and the solid content concentration was set at 56%. Using a die coater, such a paste was applied onto both surfaces of aluminum foil, and was dried, followed by pressing, thereby manufacturing a positive electrode sheet.

Further, natural graphite (C) as a negative electrode active material, styrene butadiene rubber (SBR) as a binder, and carboxyl methyl cellulose (CMC) as a thickener were mixed at mass ratios of C:SBR:CMC=98:1:1 in ion exchanged water, thereby preparing a negative electrode active material layer forming paste. Using a die coater, such a paste was applied onto both surfaces of copper foil, and was dried, followed by pressing, thereby manufacturing a negative electrode sheet.

As the separator sheets, two porous polyolefin sheets each having a three-layered structure of PP/PE/PP, and having a thickness of 24 µm were prepared.

The manufactured positive electrode sheet and negative electrode sheet, and the prepared two separator sheets were stacked one on another, and were wound, thereby manufacturing a wound electrode body. Electrode terminals were mounted on the positive electrode sheet and the negative electrode sheet of the manufactured wound electrode body by welding, respectively. This was accommodated in a battery case having a liquid injection port.

A nonaqueous electrolyte was injected from such a liquid injection port, and the liquid injection port was hermetically sealed by a sealing lid. Incidentally, as the nonaqueous electrolyte, the one obtained by dissolving $LiPF_6$ as a support salt in a mixed solvent including ethylene carbonate (EC), dimethyl carbonate (DMC), and ethyl methyl carbonate (EMC) at volume ratios of 1:1:1 in a concentration of 1.0 mol/L was used. In the manner described up to this point, an evaluating lithium ion secondary battery was obtained.

Activating Treatment

Under 25° C. environment, each evaluating lithium ion secondary battery was subjected to an activating treatment (first charging). The activating treatment was performed in the following manner: with the constant current—constant voltage system, constant current charging was performed at a current value of 1/3 C up to 4.2 V, and then, constant voltage charging was performed until the current value became 1/50 C, resulting in a fully charged state. Subsequently, constant current discharging was performed until the voltage became 3.0 V at a current value of 1/3 C.

Discharge Capacity Measurement Under Low Temperature Environment

Each evaluating lithium ion secondary battery after the activating treatment was adjusted to an open voltage of 4.0 V, and then was placed under −10° C. temperature environment. Constant current discharging was performed at a discharging rate of 1 C to 3.0 V, thereby measuring the discharge capacity. Further, under the same conditions, adjustment was performed to an open voltage of 4.0 V, and then, constant current discharging was performed at a discharging rate of 10 C to 3.0 V, thereby measuring the discharge capacity. The discharge capacity of 10 C was divided by the discharge capacity of 1 C, thereby calculating the discharge capacity under low temperature environment. The discharge capacity ratios of other Comparative Examples and Examples when the discharge capacity of Comparative Example 1 was assumed to be 1 were determined. Incidentally, the larger such a discharge capacity ratio is, the higher the output characteristic under low temperature environment can be evaluated. The results are shown in Table 1.

Measurement of Initial Resistance and Resistance Increase Rate After High Rate Charging and Discharging Cycle Each evaluating lithium ion secondary battery after the activating treatment was adjusted to an open voltage of 3.80 V, and then, was placed under 0° C. temperature environment. Discharging was performed at a current value of 1 C for 2 seconds, thereby determining the voltage drop amount (ΔV). Such a voltage drop amount ΔV was divided by the discharging current value (1 C), thereby calculating the battery resistance, which was referred to as the initial resistance.

Each evaluating lithium ion secondary battery for which the initial resistance was measured was placed under 0° C. environment. Thus, the charging and discharging cycle including constant current charging at 30 C to 4.3 V, and constant current discharging at 30 C to 3.1 V as one cycle was repeated for 500 cycles. The battery resistance at the 500th cycle was measured in the same manner as described above. The resistance increase rate was determined by the formula: (battery resistance at 500th charging and discharging cycle—initial resistance)/initial resistance. The ratios of the resistance increase rates of other Comparative Examples and Examples when the resistance increase rate of Comparative Example 1 was assumed to be 1 were determined. Incidentally, it can be evaluated as follows: the smaller such a ratio of the resistance increase rate is, the more the increase in resistance upon repeating charging and discharging is suppressed. The results are shown in Table 1.

TABLE 1

| | Incorporation in solid solution of Ti | Crystal structure of $TiO_2$ | Ti abundance as $TiO_2$ (A) | Ti abundance as LiTi composite oxide (B) | Abundance ratio (A/B) | Discharge capacity ratio | Ratio of resistance increase rate |
|---|---|---|---|---|---|---|---|
| Comparative Example 1 | None | — | 0 | 0 | — | 1.00 | 1.00 |
| Comparative Example 2 | None | Brookite type | 59 | 41 | 1.4 | 1.25 | 0.95 |
| Comparative Example 3 | Observed | Brookite type | 100 | 0 | — | 1.08 | 0.83 |
| Comparative Example 4 | Observed | — | 0 | 100 | — | 1.09 | 0.91 |
| Comparative Example 5 | Observed | Anatase type | 62 | 38 | 1.6 | 1.11 | 0.84 |
| Comparative Example 6 | Observed | Rutile type | 63 | 37 | 1.7 | 1.18 | 0.82 |
| Example 1 | Observed | Brookite type | 59 | 41 | 1.4 | 1.54 | 0.67 |
| Example 2 | Observed | Brookite type | 4 | 96 | 0.04 | 1.29 | 0.76 |
| Example 3 | Observed | Brookite type | 10 | 90 | 0.1 | 1.50 | 0.68 |
| Example 4 | Observed | Brookite type | 82 | 18 | 4.6 | 1.45 | 0.70 |
| Example 5 | Observed | Brookite type | 91 | 9 | 10.1 | 1.27 | 0.80 |

Comparison between Comparative Example 1, and Examples and other Comparative Examples indicates as follows: provision of the coating part including a titanium-containing compound results in an increase in discharge capacity ratio, and results in a decrease in ratio of the resistance increase rate. Further, comparison between Comparative Examples 2 to 6 and Example 1 indicates as follows: the positive electrode active material having a coating part including a titanium-containing compound on at least the partial surface of the core part, and including brookite type $TiO_2$ and a LiTi composite oxide as titanium-containing compounds, in which at least some of Ti included in the titanium-containing compound is incorporated in a solid solution in the surface of the core part has a large discharge capacity ratio, and a small ratio of the resistance increase rate. Namely, with the positive electrode active material herein disclosed, it is possible to implement a secondary battery favorable in output characteristic at low temperatures, and suppressed in increase in resistance upon repeating charging and discharging.

shown in Table 2 are the discharge capacity ratio and the ratio of the resistance increase rate of each Example when the result of Comparative Example 1 is assumed to be 1.

TABLE 2

|  | Incorporation in solid solution of Ti | Ti abundance as $TiO_2$ (A) | Ti abundance as LiTi composite oxide (B) | Abundance ratio (A/B) | Amount of Ti (part(s)) | Discharge capacity ratio | Ratio of resistance increase rate |
|---|---|---|---|---|---|---|---|
| Comparative Example 1 | None | 0 | 0 | — | — | 1.00 | 1.00 |
| Example 1 | Observed | 59 | 41 | 1.4 | 2.5 | 1.54 | 0.67 |
| Example 6 | Observed | 60 | 40 | 1.5 | 0.1 | 1.36 | 0.81 |
| Example 7 | Observed | 59 | 41 | 1.4 | 0.3 | 1.49 | 0.72 |
| Example 8 | Observed | 58 | 42 | 1.4 | 1.5 | 1.63 | 0.72 |
| Example 9 | Observed | 59 | 41 | 1.4 | 5 | 1.59 | 0.65 |
| Example 10 | Observed | 59 | 41 | 1.4 | 7.5 | 1.45 | 0.67 |
| Example 11 | Observed | 58 | 42 | 1.4 | 10 | 1.28 | 0.70 |

\* The amount of Ti (part(s)) is the amount of Ti (part(s)) included in the core part for every 100 parts of the metal elements except for the alkali metal elements included in the core part in terms of mol.

Further, comparison among Examples 1 to 5 indicates as follows: when the abundance ratio (A/B) of Ti in the coating part is 0.1 or more and 4.6 or less, the discharge capacity ratio is particularly large, and the ratio of the resistance increase rate is particularly small.

Examples 6 to 11

$LiNi_{1/3}Co_{1/3}Mn_{1/3}O_2$ as the core part, and brookite type $TiO_2$ and $Li_2TiO_3$ as titanium-containing compounds were charged into a mechanochemical device, and were subjected to a mechanochemical treatment at a number of revolutions of 6000 rpm for 30 minutes. By changing the amount of the brookite type $TiO_2$ and $Li_2TiO_3$ with respect to the amount of the core part, the amount of Ti for every 100 parts of the metal elements except for the alkali metals included in the core part was changed. The powder after the mechanochemical treatment was subjected to a heat treatment at a temperature of 500° C. for 1 hour. As a result of this, at least some of Ti included in the coating part was incorporated in a soli solution in the surface of the core part. In this manner, the active materials of Examples 6 to 11 were obtained.

Observation of Positive Electrode Active Material

By performing element mapping using TEM-EDX as described above, it was confirmed that at least some of Ti of the titanium-containing compound was incorporated in a solid solution. Further, the abundance ratio (A/B) of Ti in the coating part was calculated by the foregoing procedure based on the Ti peak analysis by XAFS.

By quantitative analysis using ICP emission analyzer (ion chromatograph ISC-5000 manufactured by Nippon Dionex K.K.), the "amount of metal elements except for the alkali metals included in the core part" and the "amount of Ti included in the coating part" were calculated in terms of mol. As a result of this, the amount of Ti included in the coating part for every 100 parts of the metal elements except for the alkali metals included in the core part (which will be hereinafter referred to as the amount of Ti included in the coating part) was calculated. The results are shown in Table 2.

Using the active materials, each evaluating lithium ion secondary battery was manufactured in the same manner as described above, and the output characteristic under low temperature environment and the resistance increase rate after cycle charging and discharging were evaluated in the same manner as described above. Incidentally, the results Table 2 also shows the results of Example 1 and Comparative Example 1 together.

As shown in Table 2, it is indicated that when the amount of Ti included in the coating part is 0.1 part or more and 10 parts or less, the discharge capacity ratio increases, and the ratio of the resistance increase rate decreases. Further, it is indicated that when the amount of Ti included in the coating part is 0.3 part or more and 7.5 parts or less, the discharge capacity ratio is very large, and the ratio of the resistance increase rate is very small. Still further, it is indicated that when the amount of Ti included in the coating part is 1.5 parts or more and 7.5 parts or less, the discharge capacity ratio is particularly large, and the ratio of the resistance increase rate is particularly small.

Examples 12 to 16 and Comparative Examples 7 to 11

$LiCoO_2$, $LiMn_2O_4$, $LiNiO_2$, $LiNi_{0.5}Mn_{1.5}O_4$, and $LiNi_{0.8}Co_{0.15}Al_{0.05}O_2$ were prepared as the core parts. Each core part, and the brookite type $TiO_2$ and $Li_2TiO_3$ as titanium-containing compounds were charged into a mechanochemical device, and were subjected to a mechanochemical treatment and a heat treatment under the foregoing conditions, resulting in active materials of Examples 12 to 16. On the other hand, $LiMn_2O_4$, $LiNiO_2$, $LiNi_{0.5}Mn_{1.5}O_4$, and $LiNi_{0.8}Co_{0.15}Al_{0.05}O_2$ were used as they were (i.e., without being subjected to a mechanochemical treatment and a heat treatment) as the active materials of Comparative Examples 7 to 11.

For Examples 1, and 12 to 16, the abundance ratios (A/B) of Ti in the coating part and the amounts of Ti included in the coating part were adjusted so as to be roughly equal.

Using each active material of Examples 12 to 16 and Comparative Examples 7 to 11, an evaluating lithium ion secondary battery was manufactured in the same manner as described above, and the output characteristic under low temperature environment and the resistance increase rate after cycle charging and discharging were evaluated in the same manner as described above. Incidentally, the results shown in Table 3 are the discharge capacity ratios and the ratios of the resistance increase rate of other Comparative Examples and Examples when the result of Comparative Example 1 is assumed to be 1.

TABLE 3

|  | Base material active material | Incorporation in solid solution of Ti | Ti abundance as $TiO_2$ (A) | Ti abundance as LiTi composite oxide (B) | Abundance ratio (A/B) | Amount of Ti (part(s)) | Discharge capacity ratio | Ratio of resistance increase rate |
|---|---|---|---|---|---|---|---|---|
| Comparative Example 1 | $LiNi_{0.33}Co_{0.33}Mn_{0.33}O_2$ | None | 0 | 0 | — | — | 1.00 | 1.00 |
| Example 1 | $LiNi_{0.33}Co_{0.33}Mn_{0.33}O_2$ | Observed | 59 | 41 | 1.4 | 2.5 | 1.54 | 0.67 |
| Comparative Example 7 | $LiCoO_2$ | None | 0 | 0 | — | — | 1.00 | 1.00 |
| Example 12 | $LiCoO_2$ | Observed | 60 | 40 | 1.5 | 2.5 | 1.45 | 0.76 |
| Comparative Example 8 | $LiMn_2O_4$ | None | 0 | 0 | — | — | 1.00 | 1.00 |
| Example 13 | $LiMn_2O_4$ | Observed | 60 | 40 | 1.5 | 2.5 | 1.39 | 0.74 |
| Comparative Example 9 | $LiNiO_2$ | None | 0 | 0 | — | — | 1.00 | 1.00 |
| Example 14 | $LiNiO_2$ | Observed | 58 | 42 | 1.4 | 2.5 | 1.54 | 0.69 |
| Comparative Example 10 | $LiNi_{0.5}Mn_{1.5}O_4$ | None | 0 | 0 | — | — | 1.00 | 1.00 |
| Example 15 | $LiNi_{0.5}Mn_{1.5}O_4$ | Observed | 59 | 41 | 1.4 | 2.5 | 1.47 | 0.68 |
| Comparative Example 11 | $LiNi_{0.8}Co_{0.15}Al_{0.05}O_2$ | None | 0 | 0 | — | — | 1.00 | 1.00 |
| Example 16 | $LiNi_{0.8}Co_{0.15}Al_{0.05}O_2$ | Observed | 59 | 41 | 1.4 | 2.5 | 1.49 | 0.68 |

* The amount of Ti (part(s)) is the amount of Ti (part(s)) included in the core part for every 100 parts of the metal elements except for the alkali metal elements included in the core part in terms of mol.

Table 3 also shows the results of Example 1 and Comparative Example 1 together. As shown in Table 3, it is indicated that, in any Example, as compared with Comparative Examples, the output characteristic under low temperature environment of a lithium ion secondary battery is larger, and the resistance increase rate after cycle charging and discharging is smaller. This indicates as follows: regardless of the composition and the crystal structure of the core part, the positive electrode active material in which at least a partial surface of the core part is coated with a coating part including a titanium-containing compound, and at least some of Ti of the titanium-containing compound is incorporated in a solid solution in the surface of the core part is remarkably improved in output characteristic under low temperature environment, and is suppressed in increase in resistance after cycle charging and discharging. Further, comparison among Examples 1, and 12 to 16 indicates as follows: when the core part is a lithium transition metal composite oxide including at least Ni as a transition metal element, the output characteristic under low temperature environment is particularly improved, and the resistance increase rate after cycle charging and discharging is particularly suppressed.

Up to this point, specific examples of the present disclosure were described in details. However, these are merely illustrative, and should not be construed as limiting the scope of the appended claims. The technology described in the appended claims includes various modifications and changes of the specific examples exemplified up to this point.

What is claimed is:

1. A positive electrode active material for use in a nonaqueous electrolyte secondary battery,
the positive electrode active material, comprising:
a core part including a lithium transition metal composite oxide; and
a coating including a titanium-containing compound on at least a partial surface of the core part, wherein
the titanium-containing compound includes a mixture of a brookite type $TiO_2$ and a LiTi composite oxide including Li and Ti,
at least part of Ti of the titanium-containing compound is incorporated in a solid solution in a surface of the core part, and
the coating part includes a Ti abundance having an abundance ratio (A/B) of 0.1 or more and 4.6 or less, wherein (A) represents brookite type $TiO_2$ and (B) represents LiTi composite oxide, and the Ti abundance is calculated based on Ti peak analysis of XAFS being 100.

2. The positive electrode active material according to claim 1,
wherein an amount of Ti included in the coating part is 0.1 part or more and 10 parts or less, relative to 100 parts of a metal element except for an alkali metal element included in the core part calculated in terms of mol based on ICP analysis.

3. The positive electrode active material according to claim 1,
wherein the core part includes the lithium transition metal composite oxide including at least Ni as a transition metal element.

4. The positive electrode active material according to claim 1, wherein the abundance ratio (A/B) is 1.4 or more.

5. A nonaqueous electrolyte secondary battery comprising a positive electrode, a negative electrode, and a nonaqueous electrolyte, wherein
the positive electrode includes the positive electrode active material according to claim 1.

6. A positive electrode active material for use in a nonaqueous electrolyte secondary battery,
the positive electrode active material, comprising:
a core part including a lithium transition metal composite oxide; and
a coating part including a titanium-containing compound on at least a partial surface of the core part, wherein
the titanium-containing compound includes a single layer comprising brookite type $TiO_2$ and a LiTi composite oxide including Li and Ti,
at least part of Ti of the titanium-containing compound is incorporated in a solid solution in a surface of the core part, and the coating part includes a Ti abundance having an abundance ratio (A/B) of 0.1 or more and 4.6 or less, wherein (A) represents brookite type $TiO_2$ and (B) represents LiTi composite oxide, and the Ti abundance is calculated based on Ti peak analysis of XAFS being 100.

7. The positive electrode active material according to claim 6, wherein the abundance ratio (A/B) is 1.4 or more.

\* \* \* \* \*